United States Patent [19]
Takahashi et al.

[11] Patent Number: 5,278,600
[45] Date of Patent: Jan. 11, 1994

[54] PHOTOGRAPHIC FILM CASSETTE

[75] Inventors: Koichi Takahashi; Hideaki Kataoka, both of Kanagawa, Japan

[73] Assignee: Fuji Photo Film Co., Ltd., Kanagawa, Japan

[21] Appl. No.: 757,420

[22] Filed: Sep. 10, 1991

[30] Foreign Application Priority Data

Sep. 10, 1990 [JP] Japan .................. 2-240397

[51] Int. Cl.⁵ .............................................. G03B 17/26
[52] U.S. Cl. ................................. 354/275; 242/71.1
[58] Field of Search ................. 354/21, 275, 173.1, 354/212, 288; 242/71, 71.1, 71.2

[56] References Cited

U.S. PATENT DOCUMENTS

| | | | |
|---|---|---|---|
| 2,336,278 | 12/1943 | Mihalyi | 354/214 |
| 2,360,255 | 10/1944 | Mihalyi | 242/71.5 |
| 2,364,381 | 12/1944 | Mihalyi | 242/71 |
| 2,521,935 | 9/1950 | Monroe | 227/81 |
| 2,552,200 | 5/1951 | Mihalyi | 242/71.1 |
| 3,467,340 | 9/1969 | Rosenburgh | 242/197 |
| 3,556,435 | 1/1971 | Wangerin | 242/210 |
| 3,627,229 | 12/1971 | Wangerin | 242/200 |
| 3,627,230 | 12/1971 | Wangerin | 242/210 |
| 3,677,499 | 7/1972 | Wangerin | 242/210 |
| 3,797,777 | 3/1974 | Hosono et al. | 242/177 |
| 4,962,401 | 10/1990 | Takahashi | 354/275 |
| 5,003,334 | 3/1991 | Pagano et al. | 354/275 |
| 5,048,770 | 9/1991 | Baxter et al. | 354/275 X |
| 5,106,030 | 4/1992 | Pagano et al. | 354/275 X |

FOREIGN PATENT DOCUMENTS 2921379 11/1980 Fed. Rep. of Germany .

*Primary Examiner*—Michael L. Gellner
*Assistant Examiner*—Howard B. Blankenship
*Attorney, Agent, or Firm*—Sughrue, Mion, Zinn, Macpeak & Seas

[57] ABSTRACT

The rotation of a spool of a photographic film cassette in a film unwinding direction in a camera advances a film leader out of a cassette shell through a film passage mouth. An indicator window is formed on a surface of the cassette shell. A rotatable indicator wheel behind the indicator window carries an indication representing a degree of exposure of the photographic film, or unexposed, exposed, and numerals for frames at which the latest photograph was taken. A drive wheel is rotated in linkage with the spool for rotating the indicator wheel in order to move the indication into the indicator window. A clutch pin, which is connected with a pin receiver, transmits movement of the drive wheel to the indicator wheel when the spool rotates in the film unwinding direction. The indicator wheel is left separated from the drive wheel with the clutch pin disconnected from the pin receiver, when rotating the spool in a film rewinding direction. In a preferred embodiment, a toothed wheel, which carries an indicator for displaying the amount of film used, is rotated by the camera when advancing the photographic film. In another preferred embodiment, a heat-sensitive label is provided on the cassette shell for displaying the amount of film used in a visible manner by being heated according to the degree of film exposed in the camera.

12 Claims, 9 Drawing Sheets

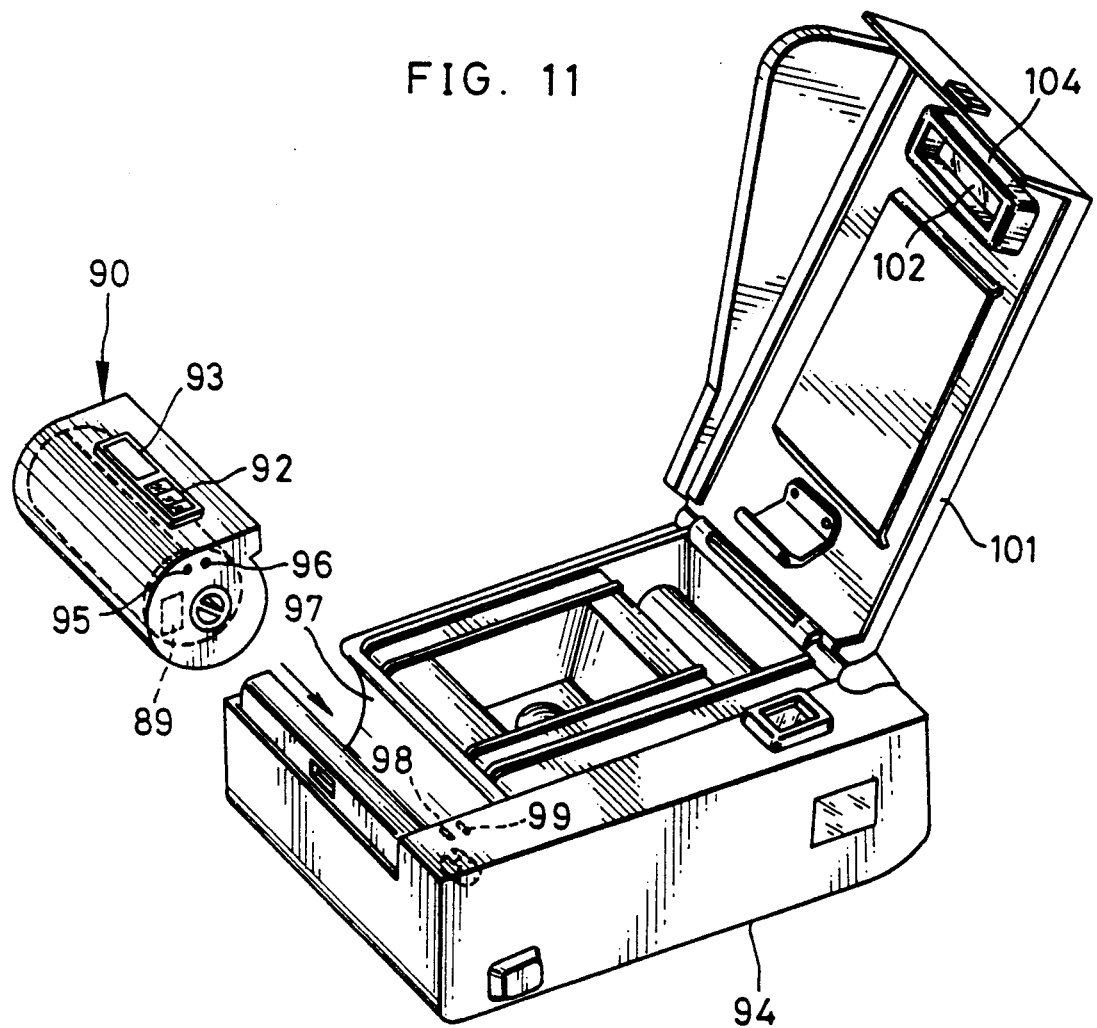

5,278,600

PHOTOGRAPHIC FILM CASSETTE

BACKGROUND OF THE INVENTION

The present invention relates in general to a photographic film cassette, and more particularly to an improvement in a photographic film cassette of indicating on a cassette shell the degree of exposure of a photographic film.

There are known 35 mm film cassettes which have a film leader that does not protrude from a cassette shell, but which are easily loaded in a camera, as disclosed in, for example, U.S. Pat. Nos. 4,832,275, 4,834,306 and 4,846,418. The rotation of a spool by a film advancing mechanism in an unwinding direction causes the film leader of the photographic film to advance outside of the cassette shell through a film passage mouth of the film cassette.

In conventional devices, double exposure of photographic film can occur because there is no visual indication of whether a film cassette contains exposed or unexposed film. To overcome this problem, a film cassette as disclosed in Japanese Utility Model Laid-Open Publication No. 1-135441, provides a counter lever which is shiftable according to a change of the diameter of the film roll, and a counter for indicating a film feeding amount according to a detected diameter of the film roll, which detects a decrease in the diameter of the film roll around the spool as the photographic film is drawn out of the cassette shell.

In the film cassette as above, however, to detect the diameter of the film roll, the counter lever is in constant contact with the surface of the roll of film, which can scratch the surface of the photographic film. Irregularities, such as scratched surfaces, can cause the roll of film to loosen and disproportionately increase the diameter of the roll of film. As a result, a change in the film's diameter will not constantly correctly correspond to the amount that the photographic film is drawn from the film cassette, so that the indication by the counter is incorrect.

In some situations, the photographic film may contain frames which are exposed and frames which are c unexposed. In such situations, the roll is then rewound in the cassette shell, and the film cassette is unloaded from the camera. To later use the unexposed frames, the photographic film is reloaded in the camera, and advanced to wind past the exposed frames by referring to the indication in the counter. Because the indication is inaccurate, the photographic film can be advanced an excessive amount so that some unexposed portion of the photographic film might be inadvertently left unused. On the other hand, the film may not be advanced enough so that some portion overlapping the exposed frames might be double exposed.

SUMMARY OF THE INVENTION

It is therefore an object of the present invention to provide a film cassette capable of accurately indicating the degree of exposure of the photographic film.

The above and other objects and advantages of this invention are accomplished by a photographic film cassette which has a cassette shell with a film passage mouth, a spool disposed within the cassette shell having a photographic film wound thereon and in which rotation of the spool in a direction of unwinding causes a film leader to advance to outside of the cassette shell through the film passage mouth, a rotary member rotatably linked with the spool for moving an indicator means in order to display position, the indicator means being movably disposed in the displaying position carrying an indication representing the amount used of exposure of the photographic film, i.e., the number of frames which have been exposed, and rotation transmitting means for transmitting movement of the rotary member to the indicator means by being in a connected state when causing the spool to rotate in the film unwinding direction, and for leaving the indicator means separate from the rotary member when rotating the spool in a direction of rewinding the photographic film. The indication of the film usage is thus accurately displayed. Accordingly, the surfaces of the photographic film remain free of scratches, and the exposed or unexposed state of the photographic film can be detected, even when the film is wound in the cassette shell. Reloading the film cassette to use the unexposed portion of the photographic film is carried out with great ease in a manner free from failure.

In accordance with a preferred embodiment, an indicator means, disposed behind the indicator window on an inner surface of the cassette shell, carries an indication representing the amount used of the photographic film, and is rotated by a camera when advancing the photographic film in order to display the indication in the indicator window. Signal means produces a signal representing the amount used of the photographic film in accordance with an amount of rotation of the indicator means, the signal being detected by the camera.

In accordance with another preferred embodiment, indication display means is provided on an outside of the cassette shell for displaying a visible indication representing the amount used of the photographic film by receiving a signal corresponding to the amount used of the film from the camera.

BRIEF DESCRIPTION OF THE DRAWINGS

The above objects and advantages of the present invention will become more apparent from the following detailed description when read in connection with the accompanying drawings, in which;

FIG. 11 is a perspective view illustrating a film cassette in accordance with yet another preferred embodiment and a camera for use therewith.

DETAILED DESCRIPTION OF THE PREFERRED EMBODIMENTS

Figure 1:
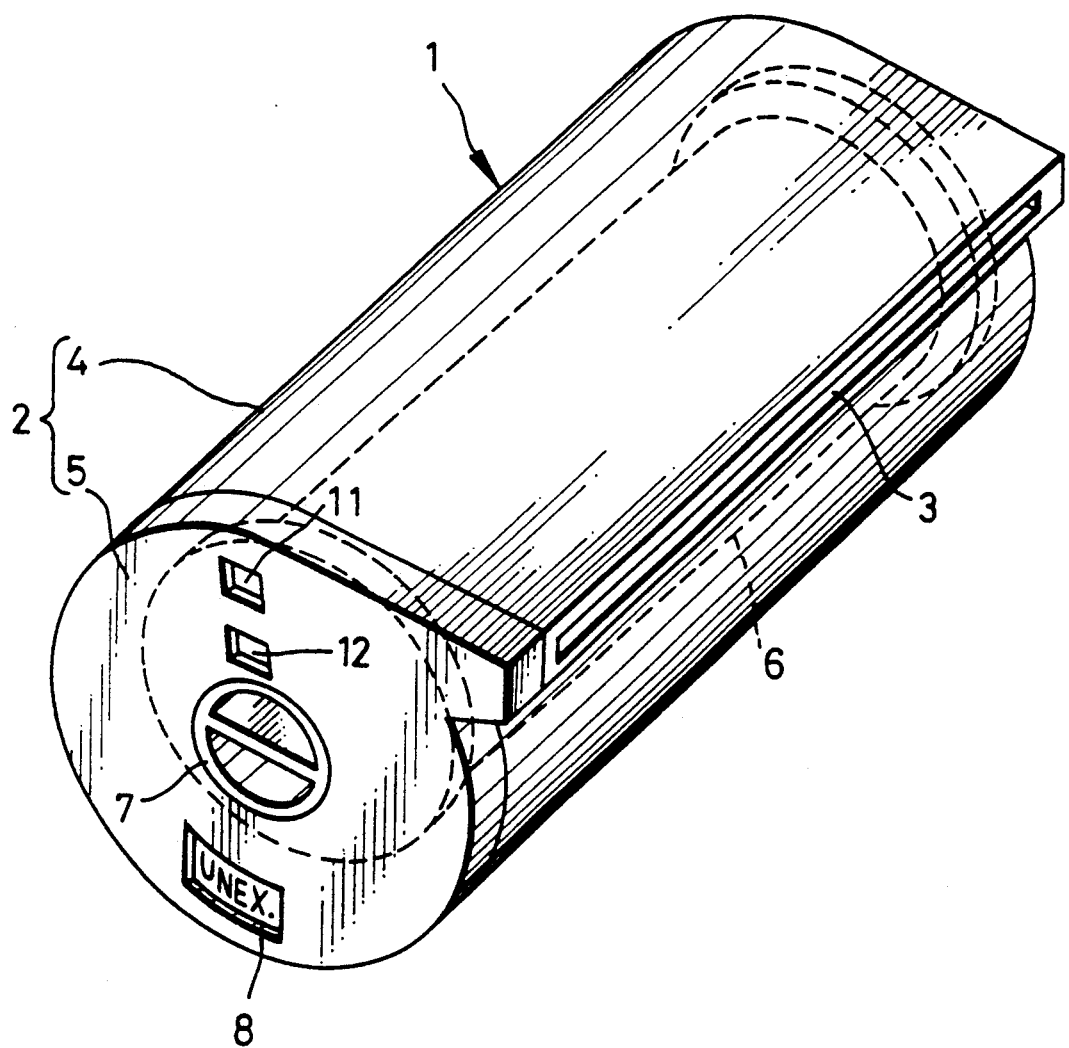
FIG. 1 is a perspective view illustrating a photographic film cassette in accordance with a preferred embodiment of the present invention.

FIG. 1 shows a photographic film cassette 1 according to the present invention, which includes a cassette shell 2 constituted by a cylindrical body 4 having a film passage mouth 3 and a cap 5 fitted thereon. A spool 7 is provided with a photographic film 6 (e.g., a negative film) wound thereon, and is rotatably supported in the cassette shell 2.

An indicator window 8 is formed in a lower portion of the cap 5 for displaying a visual indication of the amount used of the photographic film 6, such as UNEXPOSED - 1 - 2 - ... - EXPOSED. The indication is carried on an indicator wheel 15 (described below in detail). Contact holes 11 and 12 are formed in the cap 5 for providing data to a camera as to the amount used of the photographic film 6. The intervals between numerals of the literal indication increase upwards to EXPOSED because the rotating amount of the spool 7, which is required for positioning the photographic film 6 in the exposure aperture of the camera, increases according to the number of exposed frames. It is noted that the words UNEXPOSED and EXPOSED are indicated as UNEX. and EXPO. in the drawings, and that the indicator window 8 is shown to be much longer than its actual size so as to show the width of the numerals and the words. The words UNEXPOSED and EXPOSED may be replaced by other indications such as graphic symbols.

Figure 2:
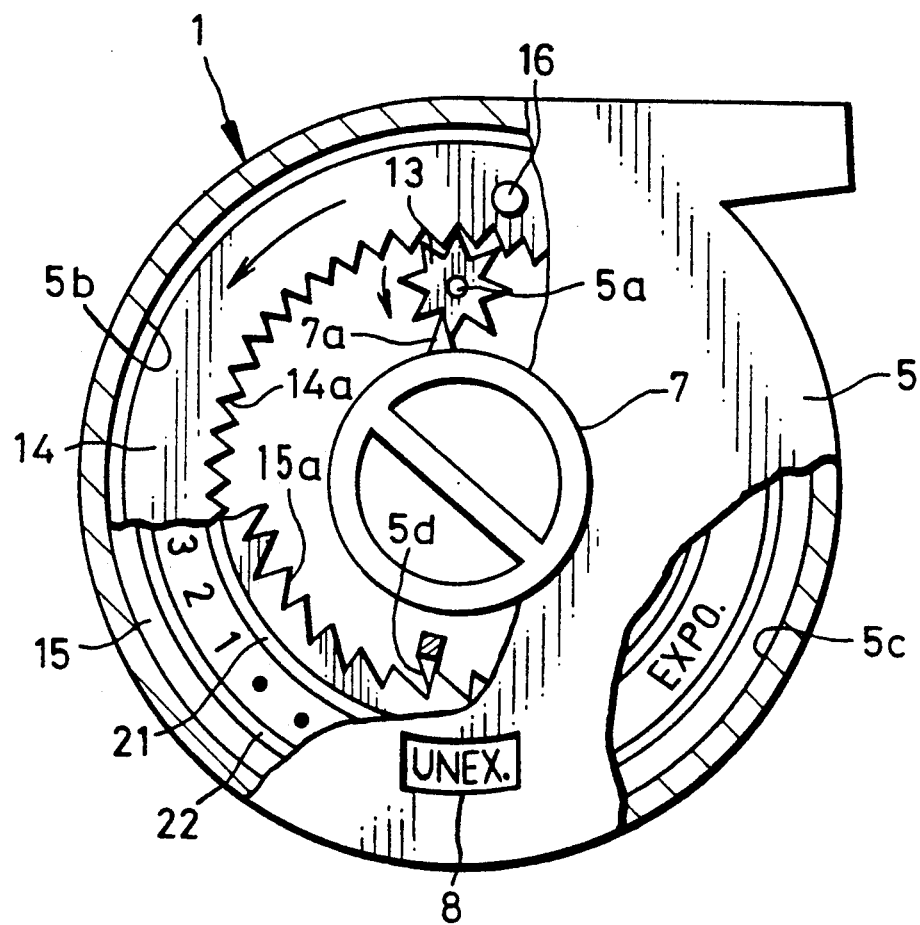
FIG. 2 is a front view, partially cut away, illustrating the film cassette illustrated in FIG. 1.
Figure 3:
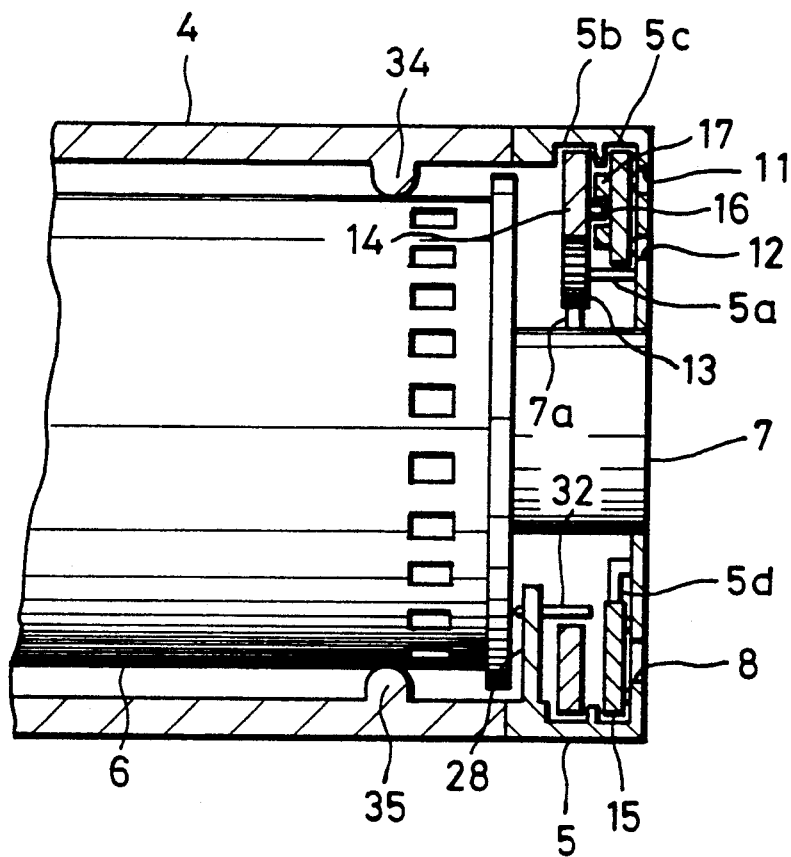
FIG. 3 is a side section view illustrating a portion of the film cassette as illustrated in FIG. 1.

FIGS. 2 and 3 illustrate the inside of the cap 5, wherein an engaging tooth 7a formed on the core of the spool 7 is in mesh with a pinion gear 13 rotatably supported on a shaft 5a formed integrally with the cap 5. The pinion gear 13 is in mesh with an internal gear 14a of a drive wheel 14, and drives an indicator wheel 15 which carries the train of numerals and letters printed or stamped thereon. The drive wheel 14 is rotatably supported in an annular groove 5b formed on an inside circumferential surface of the cap 5. The gear ratios between the engaging tooth 7a, the pinion gear 13, and the internal gear 14a are determined so that the drive wheel 14 makes less than one rotation, even when the entire photographic film 6 is unwound, but the engaging tooth 7a is rotated a plural number of times. As an alternative, two or more engaging teeth can be formed on the core of the spool 7 at a constant interval instead of the single engaging tooth 7a.

Figure 4:
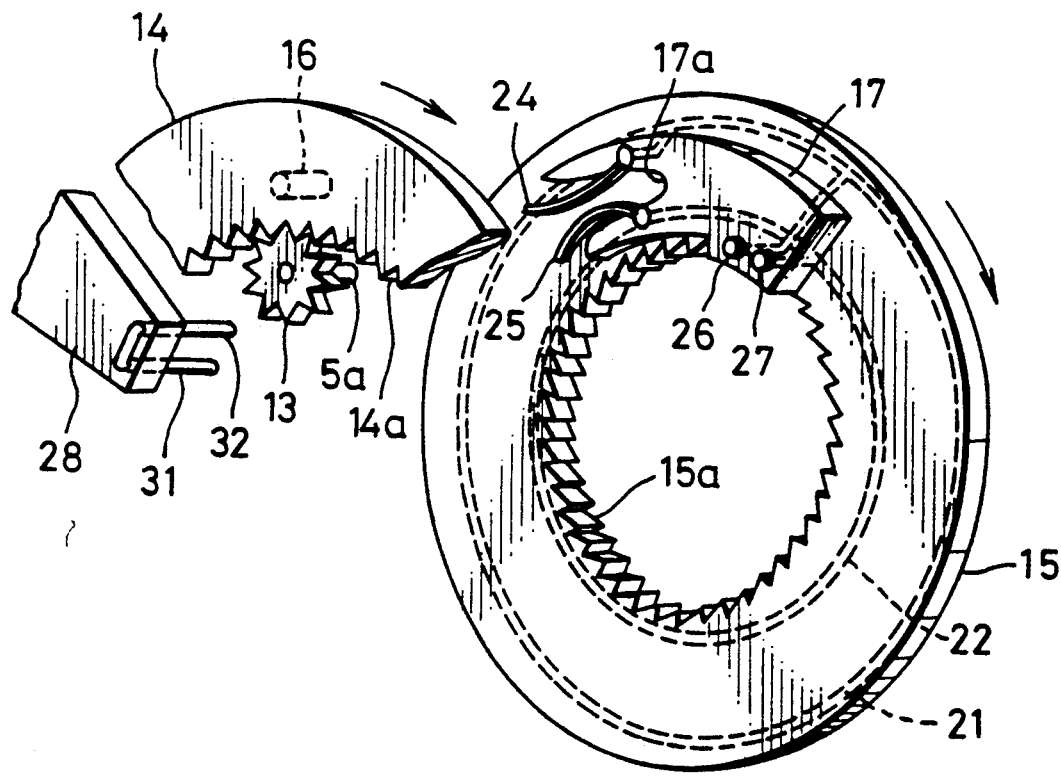
FIG. 4 is an exploded perspective view illustrating an important portion of the film cassette as illustrated in FIG. 1.
Figure 5:
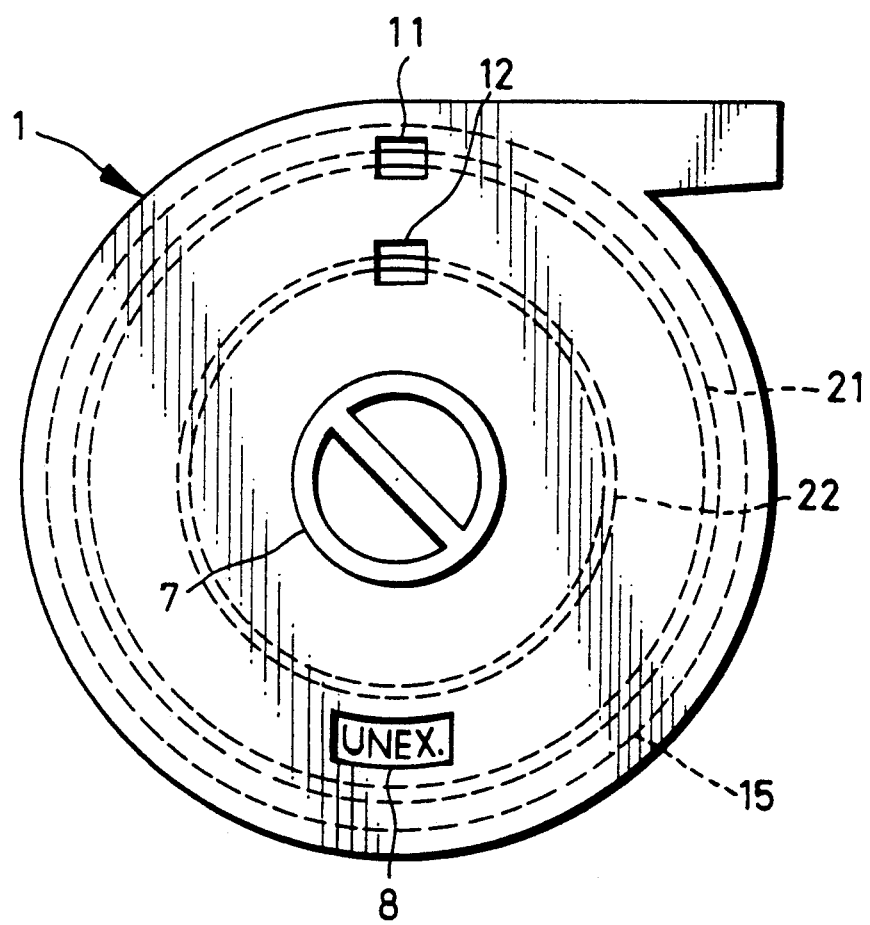
FIG. 5 is a front view illustrating the relation of annular conductors and holes.

A clutch pin 16 made of an electrically conductive material is fixed on the outside of the drive wheel 14. A pin receiver 17 is attached to the inside of the indicator wheel 15 and engages the clutch pin 16 on a receiving recess 17a for rotating the indicator wheel 15 as illustrated in FIG. 4. The indicator wheel 15 is rotatably supported in an annular groove 5c formed on the inside circumferential surface of the cap 5. An internal ratchet 15a is formed on the opening of the indicator wheel 15 so that its teeth are inclined in one direction. The cooperation of the internal ratchet 15a with a pawl 5d formed on the cap 5 allows the indicator wheel 15 to rotate in the direction indicated by the arrow shown in FIG. 4, and prevents it from rotating in reverse.

The outer surface of the indicator wheel 15 is provided with annular conductors or annular terminals 21 and 22 having annular shapes outside and inside, respectively, the literal indication. The diameters of the annular conductors 21 and 22 are determined to allow them to pass through the contact holes 11 and 12, and contact with the contacts of a camera. Inside edges of the receiving recess 17a of the pin receiver 17 are provided with contact segments 24 and 25 connected to the annular conductors 21 and 22, as illustrated in FIG. 4. Contact points 26 and 27 are mounted on the pin receiver 17 and connected to the annular conductors 21 and 22.

A projection 28, formed on the inside circumferential surface of the cap 5, is provided with ends 31 and 32 of a short-circuiting conductor for short-circuiting the contact points 26 and 27 when all of the photographic film 6 has been exposed. Reference numerals 34 and 35 in FIG. 3 designate arcuate ridges formed on the inside of the cylindrical body 4 for preventing the photographic film 6 from loosening in order to transmit the rotary force of the spool 7 to the film leader of the photographic film 6 so as to advance the film leader through the film passage mouth 3. A separating claw (not shown) is formed on the inside of the cylindrical body 4 for separating and directing the film leader to the film passage mouth 3.

Figure 6:
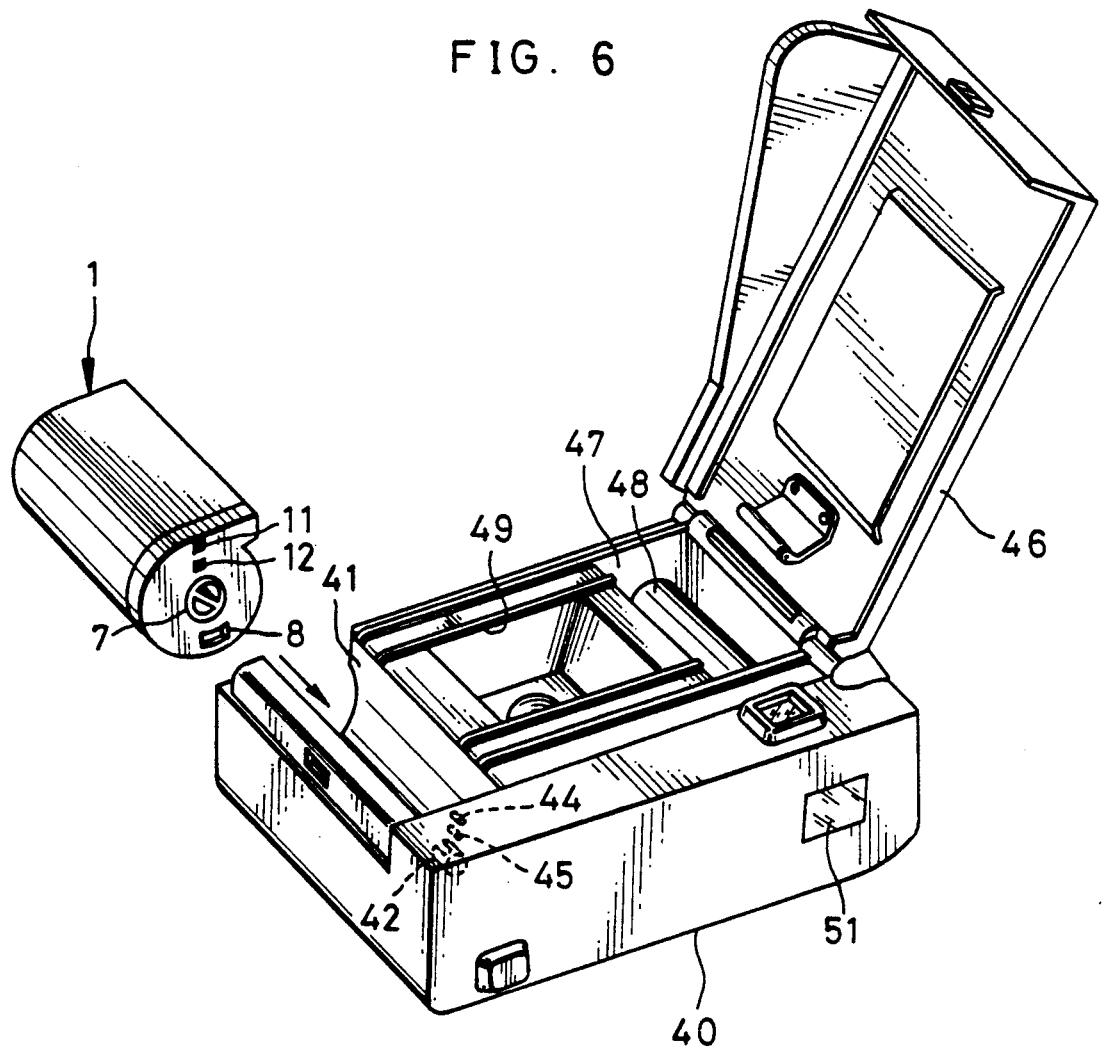
FIG. 6 is a perspective view illustrating a camera for use with the film cassette illustrated in FIG. 1 and the same film cassette.

Before the above-constructed film cassette 1 is used, the indicator window 8 shows UNEXPOSED, and the clutch pin 16 is engaged with the engaging recess 17a. When the film cassette 1 is loaded in a cassette chamber 41 of a camera 40 as illustrated in FIG. 6, the core of the spool 7 is engaged with a fork 42 in the cassette chamber 41. Contact pins 44 and 45 provided in the cassette chamber 41 over the fork 42 contact the annular conductors 21 and 22 through the contact holes 11 and 12.

With a back lid 46 is closed, the fork 42 is rotated to rotate the spool 7 in the unwinding direction. The film leader 6 is advanced through the film passage mouth 3 to a film take-up chamber 47 where it is wound on a take-up spool 48. When the photographic film 6 is fed a predetermined amount, the rotating take-up spool 48 is stopped so as to position a first frame on an exposure aperture 49.

The rotation of the spool 7 causes the drive heel 14 to rotate by means of the engaging tooth 7a, the pinion gear 13, and the internal gear 14a. The clutch pin 16 causes the pin receiver 17 to rotate the indicator wheel 15. When the first frame of the photographic film 6 is positioned on the exposure aperture 49, the drive wheel 14 stops rotating, and the numeral "1" is shown in the indicator window 8 indicating the first frame is to be photographed. After each exposure, the photographic film 6 is advanced to the next frame. Hence, after each exposure, the following frame is ready for the subsequent exposure. The indicator wheel 15 is simultaneously rotated to indicate a numeral in the indicator window 8 which corresponds to the frame number positioned on the exposure aperture 49.

To unload the film cassette 1 when some frames are exposed and other frames are unexposed, the fork 42 is rotated in reverse to wind the photographic film 6 in the cassette shell 2. The drive wheel 14 is rotated in a the reverse direction for rotating the indicator wheel 15. The indicator wheel 15 is stopped from rotating by the internal ratchet 15a which engages the pawl 5d, so that the clutch pin 16 is disengaged from the engaging recess 17a. The photographic film 6 is completely rewound in the cassette shell 2 when the drive wheel 14 returns to an initial position of the unused state. However, because the indicator wheel 15 stops at the position where the rewinding process began, the indicator window 8 of the film cassette 1 shows the frame number of the film before it was rewound. Therefore, the indicator window 8 makes it possible to prevent the film cassette 1, which contains a few exposed frames, from being mistaken for an unused film cassette.

Figure 7A:
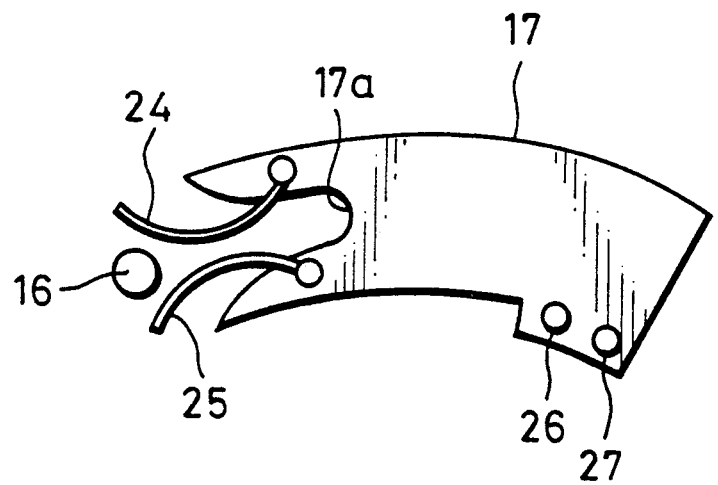
FIGS. 7A, 7B, and 7C are explanatory views illustrating an operation of an engaging pin and a pin receiver of the film cassette illustrated in FIG. 1.
Figure 7B:
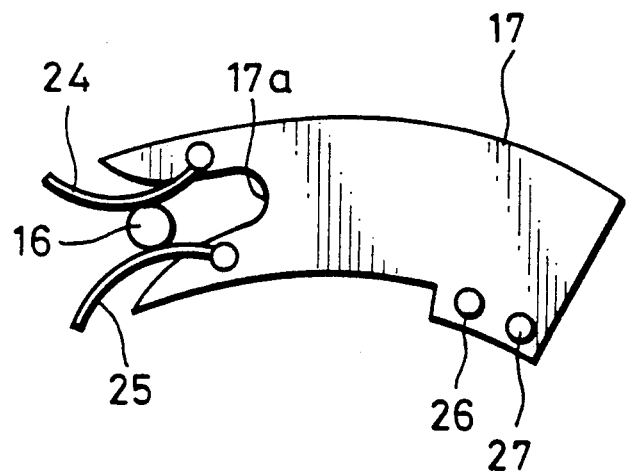
Figure 7C:
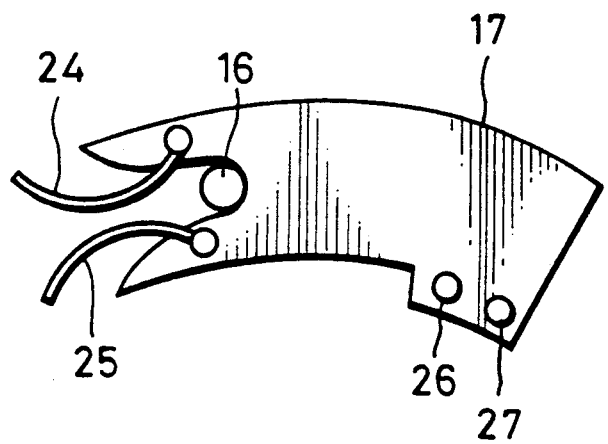

When the film cassette 1 is reloaded in the camera 40, the camera 40 rotates the spool 7 to advance the film leader. The rotation of the spool 7 rotates the drive wheel 14 to bring the clutch pin 16 near the contact segments 24 and 25, as illustrated in FIG. 7A. Further rotation of the drive wheel 14 brings the clutch pin 16 into contact with the contact segments 24 and 25 as illustrated in FIG. 7B, which contact segments are short-circuited so as to short-circuit the contact pins 44 and 45 together by means of the annular conductors 21 and 22. Although the camera 40 stops driving the fork 42 immediately upon the short-circuit, the drive wheel 14 continues to rotate an additional amount. That is, the drive wheel 14 is further rotated until the clutch pin 16 is detached from the contact segments 24 and 25, and is stopped by contact with the innermost position of the engaging recess 17a as illustrated in FIG. 7C.

The indicator wheel 15 is then rotated each time a frame is exposed. The indicator window 8 continuously indicates the next frame number to be exposed. After the final frame is exposed, the contact points 26 and 27 are short-circuited by Is respectively contacting the conductor ends 31 and 32 so as to short-circuit the contact pins 44 and 45. The fork 42, which would have been further rotated, is stopped by the camera 40 at the time of the short-circuit, that is, when the indicator window shows an indication of EXPOSED. The camera 40 reverses the rotation of the fork 42 to rewind the photographic film 6. Because the pawl 5d keeps the indicator wheel 15 from rotating in reverse, the indication of EXPOSED in the indicator window 8 remains even after the photographic film 6 is rewound in the cassette shell 2.

Accordingly, by visually observing the indicator window 8 after exposing all frames, the film cassette containing the exposed film will less likely be mistakenly reloaded in a camera. Even when such an exposed film cassette is reloaded, the contact points 26 and 27 are short-circuited by contacting the conductor ends 31 and 32. Because the photographic film 6 is not fed, the exposed film cassette 1 will not again be used. The camera 40 detects the exposed film cassette and indicates a warning such as FILM ALL EXPOSED in a liquid crystal display panel 51 mounted on the camera 40 to inform a user that the loaded film cassette is already exposed. Therefore, the user can unload the film cassette.

Figure 8:
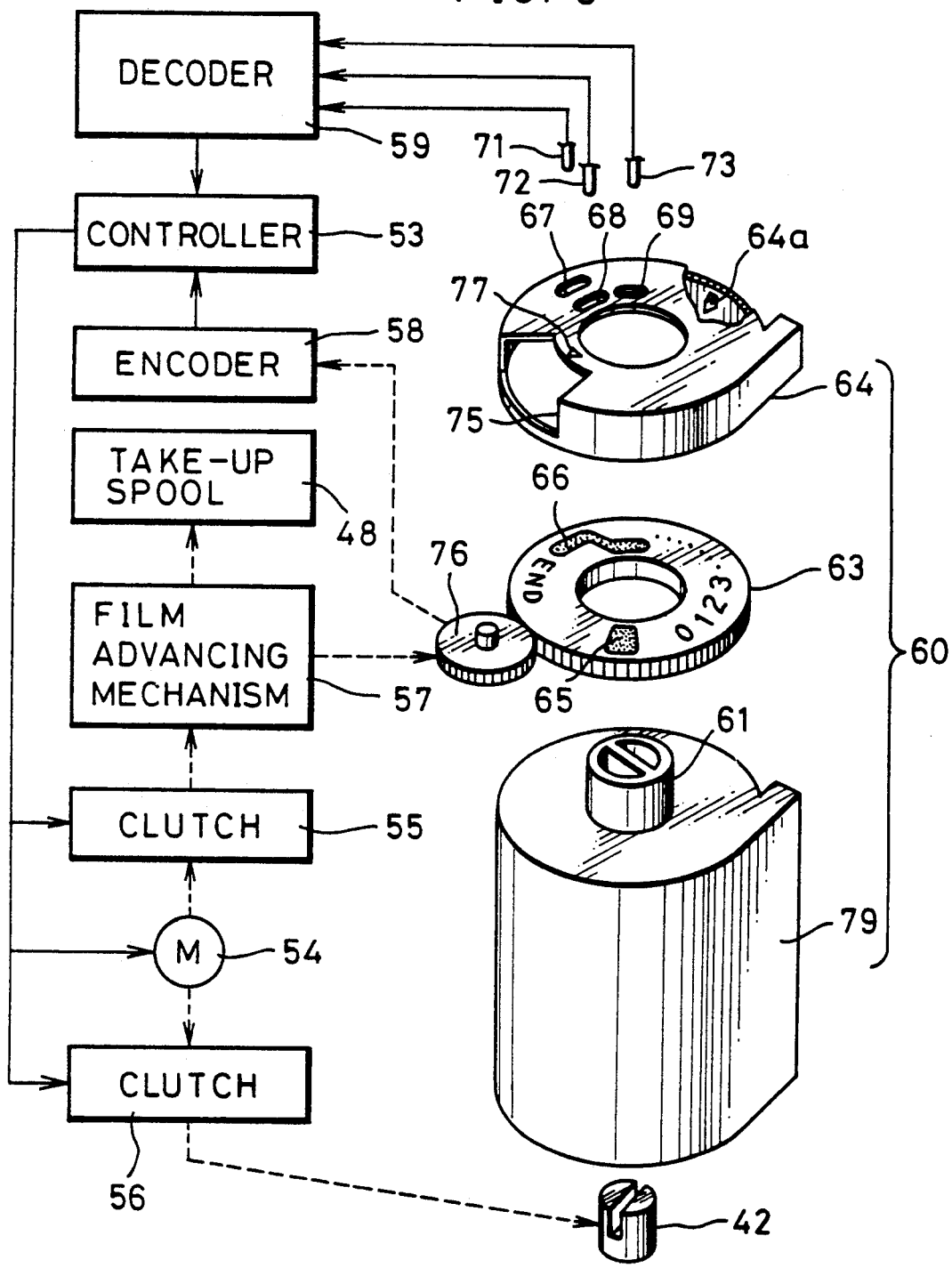
FIG. 8 is an exploded perspective view illustrating a film cassette in accordance with another preferred embodiment and mechanisms of a camera for use therewith.

Referring to FIG. 8, there is shown another preferred embodiment of the present invention. A film cassette 60 having a doughnut-shaped toothed wheel 63 is rotatably disposed around a core of a spool 61 on an end face of the cassette shell. The wheel is covered by a cap 64 fitted on a cassette shell 79. An upper surface of the toothed wheel 63 is provided with numerals and letters 0 - 1 - 2 - ... - END, and two differently shaped conductive metal patterns 65 and 66 are formed in the positions near to "0" and "END."

Three holes 67 to 69 are formed in the cap 64 for respectively receiving three contact pins 71 to 73 which come into contact with the conductive patterns 65 and 66. Before the photographic film is used, the contact pins 71 and 72 are short-circuited by the conductive pattern 65. After the entire roll of the photographic film is exposed, the contact pins 71 and 73 are short-circuited by the conductive pattern 66. When only a few of the frames on the photographic film are exposed, none of the contact pins 71 to 73 is short-circuited. Detection of a state of short-circuiting the contact pins 71 to 73 brings the camera data regarding the degree of exposure of the photographic film.

An indicator window 75 is formed in the cap 64 for displaying the literal indication printed on the toothed wheel 63. A drive gear 76 of the camera is in mesh with the teeth of the toothed wheel 63, and rotates the toothed wheel 63 a predetermined amount when one frame of the photographic film is advanced so as to indicate in the indicator window 75 the frame number positioned on the exposure aperture. The center of an inner edge of the indicator window 75 is provided with an index 77 for pointing to a frame number. The inside circumferential surface of the cap 64 is provided with a claw 64a in mesh with the teeth of the toothed wheel 63 for stopping the toothed wheel 63 from needlessly rotating.

A controller 53 of the camera controls a motor 54 which rotates the take-up spool 48, the fork 42, the drive gear 76, and clutches 55 and 56 as well as other camera mechanisms. When the back lid of the camera is closed with the film cassette 60 inserted therein, both clutches 55 and 56 are moved to a connected state. The take-up spool 48 is rotated in the film take-up chamber by a film advancing mechanism 57. Simultaneously, the fork 42 is rotated by the clutch 56 so as to rotate the spool 61 and advance the film leader. When the film leader is caught by the take-up spool 48, the clutch 56 is disconnected. The photographic film is then fed frame by frame by the film advancing mechanism 57 in a manner similar to a conventional camera. When rewinding the photographic film, the clutch 55 is disconnected whereas the clutch 56 is connected to rotate the fork 42. After the exposed photographic film is rewound in the cassette shell 79, the toothed wheel 63 is kept at a stand still by releasing the drive gear 76.

The same operation is performed when rewinding the photographic film in the film cassette 60 with unexposed frames left. When reloading this film cassette 60 in the camera, the clutch 55 is connected so that the drive gear 76 rotates the toothed wheel 63 in reverse until the numeral "0" is indicated. The amount of reverse rotation of the drive gear 76 is measured by an encoder 58. The rotating amount at the time of reaching "0" is fetched by a decoder 59. The motor 54 is rotated in the normal direction until the output of the encoder 58 indicates that the rotating amount has been reached.

The above-described film cassette 60 is loaded in the camera with a spool-rotating fork of the camera engaged with the core of the spool 61. The contact pins 71 to 73 are in contact with the upper surface of the toothed wheel 63 through the holes 67 to 69. In the film cassette 60 before exposure, the numeral "0" is pointed to by the index 77. The conductive pattern 65 is placed under the holes 67 and 68, so that the contact pins 71 and 72 are short-circuited in contact with the conductive pattern 65. The controller 53 detects that the film cassette 60 is unused according to a signal from the decoder 59, rotates the spool 61 and the take-up spool 48 to position the first frame on the exposure aperture, and rotates the drive gear 76 to position the numeral "1" to be pointed to by the index.

Each time the photographic film is advanced a frame, the toothed wheel 63 is rotated a predetermined amount. A numeral corresponding to the frame number of the frame positioned on the exposure aperture is indicated at the index 77. Upon exposing all the frames, the indication END is shown at the index 77. The conductive pattern 66 is placed beneath the holes 67 and 69 so as to short-circuit the contact pins 71 and 73. The controller 53 stops the take-up spool 48 from feeding the photographic film and starts rewinding it. The drive gear 76 is prevented from rotating during the rewinding of the film by disconnecting the clutch 55, and the toothed wheel 63 is held at a stand still.

A used film cassette is prevented from being inadvertently reloaded because the indication END is shown in the position of the index 77 when the film cassette 60 is taken out of the camera. Even when such a used film cassette is reloaded, the terminals IS 71 and 73 are short-circuited immediately. The photographic film is kept from being fed, so that the used film cassette cannot be used again and no double exposure will occur.

When the film cassette 60 is unloaded with a few frames exposed, the spool 61 is rotated in the rewinding direction although the toothed wheel 63 is not driven. The frame number just before rewinding the photographic film in the cassette shell 79 is indicated at the index 77 even after the film cassette 60 is unloaded.

When this film cassette is reloaded in the camera, the toothed wheel 63 is rotated in reverse up to a position where the numeral "0" is placed at the index 77. The reverse rotating amount of the toothed wheel 63 is measured in the controller 53 by the encoder 58 so as to detect the number of exposed frames. The motor 54 is then rotated according to the detected number. The photographic film is advanced out of the cassette shell 79 so as to position the first unexposed frame on the exposure aperture. The numeral according to the frame positioned on the exposure aperture is shown at the index 77 by rotating the toothed wheel 63.

It is noted that, if the amount of the photographic film which has already been used is recorded in detail by an IC or a magnetic recording mechanism incorporated in the camera, it is o unnecessary to rotate the toothed wheel 63 in reverse for measuring the unexposed frames or to increase the precision in positioning the numerals at the index 77.

The toothed wheel 63 may also carry an indication such as DEVELOPED, which is placed at the index by an operator of a photo laboratory to indicate that the photographic film has been developed.

Figure 9:
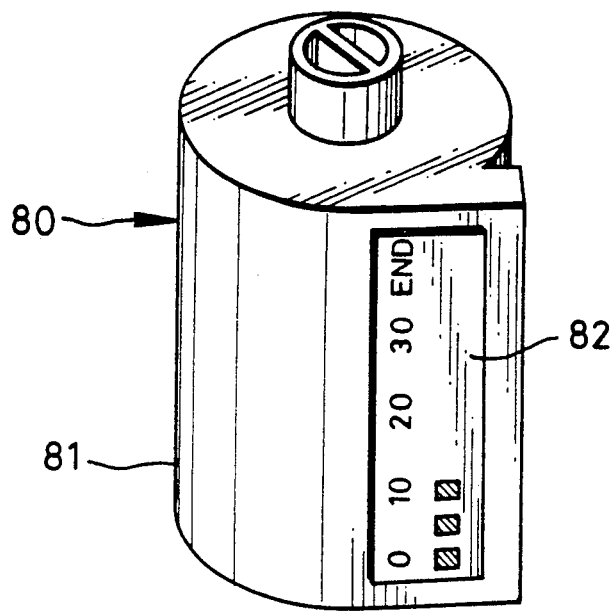
FIG. 9 is a perspective view illustrating a film cassette in accordance with a another preferred embodiment.
Figure 10:
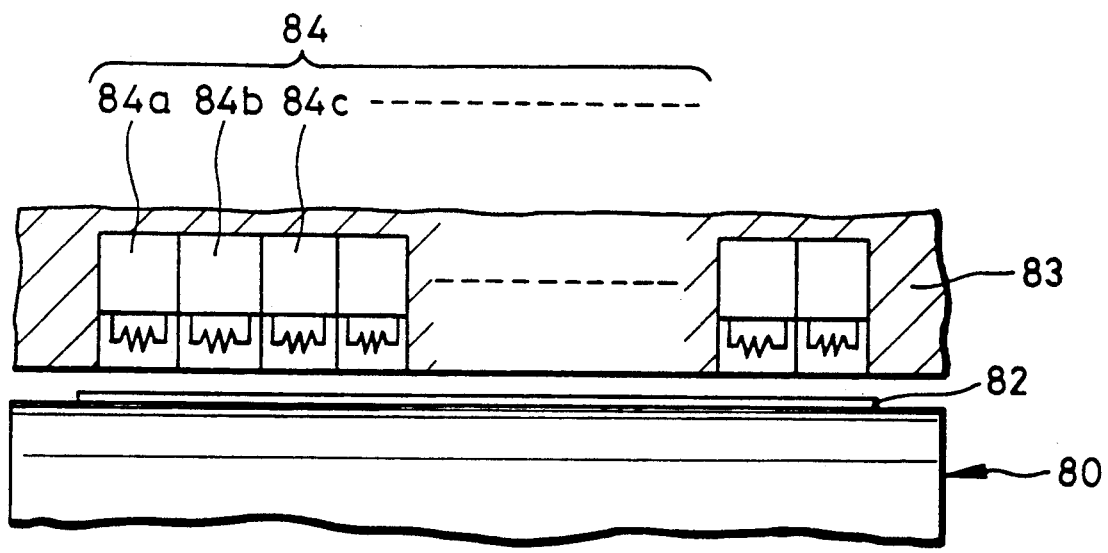
FIG. 10 is a section view illustrating a thermal head array for use with the film cassette illustrated in FIG. 9.

Another preferred embodiment is described with reference to FIGS. 9 and 10.

A film cassette 80 is provided with a heat-sensitive label 82 attached to a cylindrical surface of a cassette shell 81, which is labelled beforehand with visual numerals and letters, e.g., 0 - 10 - 20 - 30 - END. When the film cassette 80 is loaded in the camera, an array 84 of thermal heads 84a, 84b, 84c, etc. which are mounted on a back lid 83 of the camera, is sequentially driven according to the amount of the photographic film which has been used, forming black points on the heat-sensitive label 82, as illustrated in FIG. 9, which indicate the exact amount of film used.

When the film cassette 80 is reloaded after being unloaded with only a few frames exposed, the photographic film is automatically positioned in a state identical to that before the film was rewound by a sensor incorporated in the camera which detects black points on the heat-sensitive label 82. It is noted that a mechanism for pressing the circumferential surface of the cassette shell 81 may be incorporated in the camera, and that a label of pressure-sensitive paper may be attached to the cassette shell 81, instead of the above sensor and heat-sensitive label. In addition, a single shiftable thermal head may be used instead of the thermal head array 84.

Referring to FIG. 11, there is illustrated yet another preferred embodiment. A film cassette 90 is shown having an IC 89 incorporated inside, and a liquid crystal display panel (LCD) 93 connected to solar cells 92 on a lateral surface of a cassette shell 91. The LCD 93 indicates the amount of film exposed in accordance with data from the camera, e.g. letters UNEXPOSED and EXPOSED and numbers of the frame to be exposed. Reference numerals 95 and 96 designate terminals which are in contact with contact pins 98 and 99 provided in a cassette chamber 97 of the camera 94 when loading the cassette chamber 97 with the film cassette 90 so as to connect the IC 89 to a microcomputer of the camera 94.

A window 102 of transparent glass or plastic is mounted on a back lid 101 of the camera 94 in a position corresponding to the cassette chamber 97 for admitting light to the solar cells 92 and for making the LCD 93 observable from the outside. The inside of the window 102 is provided with a framing member 104 made from rubber for shielding light thereabout.

The LCD 93 shows an indication (e.g., UNEXPOSED) before the film cassette 90 is used. When the back lid 101 is closed with the cassette chamber 97 loaded in the camera 94, the photographic film is advanced to position a first frame on an exposure aperture. The data representing the amount of film used are supplied from the microcomputer of the camera 94 to the IC 89 of the film cassette 90 through the contact pins 98 and 99 and the terminals 95 and 96, so that a numeral "1" is indicated in the LCD 93. Subsequent frame numbers corresponding to the frame to be exposed are sequentially indicated by the LCD 93. Finally, EXPOSED is shown when all the frames have been exposed.

Because the indication on the LCD 93 is still unchanged even after unloading the film cassette 90 from the cassette chamber 97, the unloaded film cassette 90 containing the photographic film with a few frames exposed still provides an indication of the o amount of film used at the time the film cassette 90 is unloaded. When the film cassette 90 is reloaded, the camera 94 reads out the data stored in the IC 89 of the film cassette 90 so as to feed the photographic film, according to the data read out, up to the position on the exposure aperture in accordance with state before the film cassette 90 was unloaded.

It is noted that the positions of attaching the solar cells 92 and the LCD 93 may be otherwise on the outside of the cassette shell. A battery, e.g., a o silver-oxide battery, may also be incorporated in the film cassette 90 instead of the solar cells 92.

Although the present invention has been fully described by way of preferred embodiments thereof and with reference to the accompanying drawings, various changes and modifications will be apparent to those having skill in this field. Therefore, unless otherwise these changes and modifications depart from the scope of the present invention, they should be construed as included therein.

What we claim is:

1. A photographic film cassette for containing photographic film in a light-tight fashion, comprising:
   a cassette shell having a film passage mouth;
   an annular indicator wheel disposed in said cassette shell, for indicating an amount of said photographic film which has been used;
   a spool, disposed within said cassette shell, having said photographic film wound thereon, in which rotation of said spool in a direction of unwinding said photographic film advances a film leader outside of said cassette shell through said film passage mouth; and
   an annular drive wheel disposed in said cassette shell and rotatably linked to said spool for moving said annular indicator wheel to a displaying position, wherein said annular indicator wheel is movably disposed in said displaying position to display an indication representing said amount used of said photographic film, said annular indicator wheel and said annular drive wheel being positioned side by side so as to surround a core of said spool.

2. The photographic film cassette as recited in claim 1, further comprising movement preventing means for preventing said indicator means from being moved in a reverse direction.

3. A photographic film cassette for containing photographic film in a light-tight fashion, comprising:
   a cassette shell having a film passage mouth;
   indicator means, disposed in said cassette shell, for indicating an amount of said photographic film which has been used;
   a spool, disposed within said cassette shell, having said photographic film wound thereon, in which rotation of said spool in a direction of unwinding said photographic film advances a film leader outside of said cassette shell through said film passage mouth;
   a rotary member rotatably linked to said spool for moving an indicator means to a displaying position, wherein said indicator means is movably disposed in said displaying position to display an indication representing an amount used of said photographic film; and
   rotation transmitting means for transmitting movement of said rotary member to said indicator means by being in a connected state when said spool rotates said film in an unwinding direction, and for not transmitting movement of said rotary member to said indicator means by being in an unconnected state when said spool rotates said film in a rewinding direction.

4. The photographic film cassette as recited in claim 3, wherein said rotation transmitting means comprises:
   a clutch pin formed on said drive wheel for transmitting rotation of said drive wheel to said indicator wheel; and
   a coupling portion formed on said indicator wheel for contacting said clutch pin when said spool rotates in said film unwinding direction, said clutch pin being separated from said coupling portion when said spool is rotated in said film rewinding direction.

5. The photographic film cassette as recited in claim 4, further comprising:
   at least one tooth formed on a periphery of said core of said spool;
   a pinion provided on an inner surface of said shell end face for engaging said tooth to rotate a predetermined amount for one rotation of said spool; and
   an internal gear formed in said drive wheel for causing said drive wheel to rotate in mesh with said pinion.

6. The photographic film cassette as recited in claim 5, further comprising means for detecting that said rotation transmitting means is in said connected state.

7. The photographic film cassette as recited in claim 6, wherein said shell end face has a pair of holes formed therein, and said detecting means comprises:
   a pair of annular conductors provided on an outer surface of said indicator wheel in a shape of two coaxial circles, wherein said pair of holes formed in said shell end face allows detecting terminals of a camera to access said annular conductors; and
   a pair of contact segments provided on said coupling portion, wherein said clutch pin is conductive for short-circuiting said annular conductors when said clutch pin is received between said contact segments.

8. The photographic film cassette as recited in claim 7, wherein said contact segments are disposed side by side, and are curved respectively to be directed opposite to each other, and said clutch pin brings said contact segments in a state of continuity before said clutch pin contacts said coupling portion, and brings said contact segments in a state of discontinuity during contact of said clutch pin with said coupling portion.

9. The photographic film cassette as recited in claim 8, wherein said rotation preventing means comprises:
   an internal ratchet formed on an inside circumference of said indicator wheel; and
   a pawl formed on said inner surface of said shell end face for engaging teeth of said internal ratchet.

10. The photographic film cassette as recited in claim 9, further comprising:
    a pair of contact points provided on an inner surface of said indicator wheel for being respectively connected to said pair of annular conductors; and
    a short-circuiting conductor mounted inside of said cassette shell, both ends of said short-circuiting conductor being in contact with said pair of terminals for short-circuiting said pair of terminals when all frames on said photographic film have been exposed.

11. The photographic film cassette as recited in claim 10, wherein two annular grooves are formed on an inside circumferential surface of said cassette shell for rotatably supporting said drive wheel and said indicator wheel respectively by being in contact with peripheries of said drive wheel and said indicator wheel.

12. A photographic camera system comprising a photographic film cassette and a photographic camera, said film cassette comprising:
    a cassette shell having a film passage mouth;
    a spool, disposed within said cassette shell, having photographic film wound thereon, in which rotation of said spool in a direction of unwinding said photographic film advances a film leader outside of said cassette shell through said film passage mouth;
    an indicator window formed on a surface of said cassette shell;
    an indicator member, movably disposed behind said indicator window, carrying an indication representing a degree of exposure of said photographic film;

a rotary member rotatably linked to said spool for moving said indicator member and said indication into said indicator window;

switch means for detecting when said rotary member is connected to said indicator member;

a pair of output terminals connected to said switch means exposed to an outside through a pair of holes within said film cassette; and said camera comprising:

a fork for rotating said spool in engagement with a core of said spool, said spool being rotated by said fork in said film unwinding direction so as to advance said film leader; and a pair of contact pins to be inserted in said holes for contacting said output terminals to stop said spool from rotating when said switch means is turned on in a state of feeding said photographic film from said film cassette while said spool rotates after loading said film cassette containing said photographic film with a portion thereof exposed.

* * * * *